(12) United States Patent
Lustig

(10) Patent No.: US 8,409,537 B2
(45) Date of Patent: Apr. 2, 2013

(54) METHOD FOR REMOVING CONTAMINANTS FROM BORON POWDER

(75) Inventor: James Michael Lustig, Mantua, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/220,053

(22) Filed: Aug. 29, 2011

(65) Prior Publication Data

US 2013/0052114 A1 Feb. 28, 2013

(51) Int. Cl.
*C01B 35/02* (2006.01)
(52) U.S. Cl. ........................................ 423/298
(58) Field of Classification Search .............. 423/298
See application file for complete search history.

(56) References Cited

U.S. PATENT DOCUMENTS

| | | | | |
|---|---|---|---|---|
| 2,987,383 A | * | 6/1961 | Schulein et al. | 23/295 R |
| 3,551,105 A | * | 12/1970 | Cooper | 423/298 |
| 7,905,942 B1 | * | 3/2011 | Layman | 75/345 |
| 2008/0311018 A1 | * | 12/2008 | Alekseeva et al. | 423/298 |
| 2011/0176983 A1 | * | 7/2011 | Karau | 423/289 |

* cited by examiner

*Primary Examiner* — Wayne Langel
(74) *Attorney, Agent, or Firm* — Cooper Legal Group, LLC

(57) ABSTRACT

Methods for removing an organic contaminant from contaminated boron powder are provided. One method includes providing a contaminated boron powder, the boron powder being comingled with an organic contaminant. The method also includes placing the contaminated boron powder and the organic contaminant comingled therewith onto an inert container. The method includes placing the inert container, the contaminated boron powder, and the organic contaminant comingled therewith, into an enclosed space. A heat source is provided in the enclosed space. The method also includes heating the contaminated boron powder and the organic contaminant comingled therewith to an elevated temperature. The method includes altering the organic contaminant so as to reduce the amount of the organic contaminant comingled with the boron powder. Another method includes reducing the amount of the organic contaminant comingled with the boron powder to not more than about 0.1 weight percent of soluble residue.

12 Claims, 3 Drawing Sheets

METHOD FOR REMOVING CONTAMINANTS FROM BORON POWDER

BACKGROUND OF THE INVENTION

1. Field of the Invention

The subject matter disclosed herein relates to removing contaminants from boron powder.

2. Discussion of the Prior Art

Boron powder is used as a primary component of boron coatings in numerous applications. Such applications include, but are not limited to boron coatings used for neutron detection, abrasion protection for die-casting dies, improved wear resistance for biomedical implants, etc. Some of these applications are adversely affected by contaminants within the boron powder, as the contaminants can be detrimental to boron coating applications.

A contaminated boron powder can include organic contaminants from various sources. For example, jet milled boron powder has been found to be susceptible to contamination from the air supply used in the milling process. Specifically, boron powder contaminants may include lubrication oil from an air compressor when compressed air is used to operate a jet mill. This contamination can result in coating defects such as non-uniform coatings and gas contamination resulting in degraded coating properties. Other example contaminants are polymeric liner material from the jet mill, adhesive materials used to attach the polymeric liner material to a jet mill interior wall, and metal particles from the jet mill interior wall.

Boron powder is a relatively expensive material which, in turn, makes both contaminated boron powder and coated goods costly missteps in the manufacturing process. Some previous methods of recovering contaminated boron powder include rinsing the powder with hexane, methylene chloride, and ethylene glycol, each in combination with filters and/or centrifuges. Therefore, there is a need for an improved apparatus and method of removing contaminants from the surfaces of boron powder particles.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a method of removing a contaminant from contaminated boron powder. The method includes providing a contaminated boron powder, the boron powder being comingled with an organic contaminant. The method also includes placing the contaminated boron powder and the contaminant comingled therewith onto an inert container. The method includes placing the inert container, the contaminated boron powder, and the contaminant comingled therewith, into an enclosed space. A heat source is provided in the enclosed space. The method also includes heating the contaminated boron powder and the contaminant comingled therewith to an elevated temperature. The method includes altering the contaminant so as to reduce the amount of the organic contaminant comingled with the boron powder.

In accordance with another aspect, the present invention provides a method of removing a contaminant from contaminated boron powder. The method includes providing a contaminated boron powder, the boron powder being comingled with an organic contaminant. The method also includes placing the contaminated boron powder and the contaminant comingled therewith onto an inert container. The method includes placing the inert container, the contaminated boron powder, and the contaminant comingled therewith, into an enclosed space. A heat source is proved in the enclosed space. The method also includes heating the contaminated boron powder and the contaminant comingled therewith to an elevated temperature. The method includes altering the contaminant so that the amount of the organic contaminant in the boron powder after a processing cycle is not more than about 0.1 weight percent of soluble residue.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
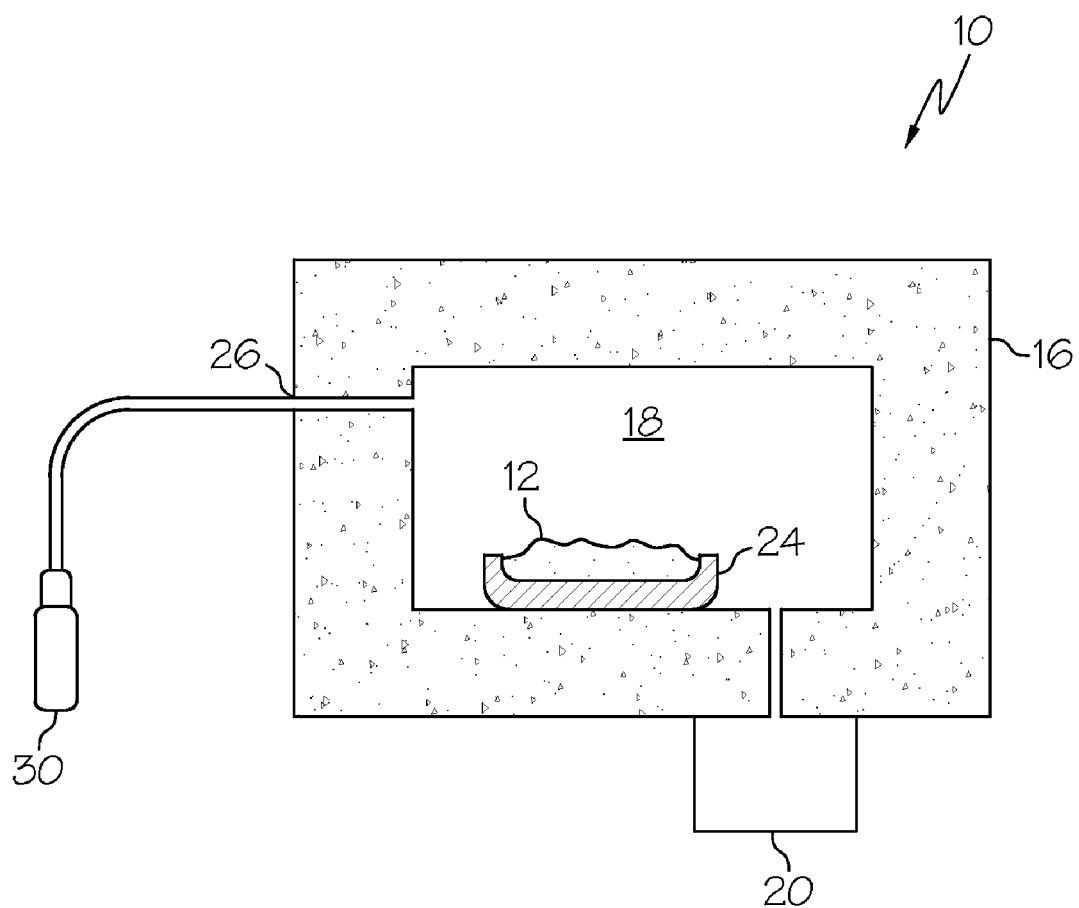
FIG. 1 is a schematized cross section view of an example furnace of an example processing system in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

An example processing system 10 for removing contaminants from boron powder 12 is generally shown within FIG. 1. In one specific example, the processing system 10 is for removing organic contaminants from boron powder 12. It is to be appreciated that the term organic is a broad and expansive classification. In one part, the classification includes materials that contain a carbon component. It is also to be appreciated that FIG. 1 merely shows one example of possible structures/configurations/etc. and that other examples are contemplated within the scope of the present invention.

The processing system 10 for removing organic contaminants from contaminated boron powder 12 includes a furnace 16, which is one example of an enclosed space. Other examples of an enclosed space include, but are not limited to batch ovens, continuous ovens, cabinet ovens, tower ovens, sintering furnaces, etc. It is to be appreciated that an interior volume 18 of the furnace 16 can be secured so that little or no ambient atmosphere can enter into the furnace during operation of the furnace. Selection of the type of furnace 16 and construction thereof is dependent upon several variables including, but not limited to, furnace heating characteristics, furnace cycle times, boron powder throughput requirements, etc. The furnace 16 also includes a heat source 20 to provide the elevated temperature within the furnace 16. The heat source 20 can be any of the typical furnace 16 or oven heat sources as are known in the art such as gas, electric heating element, infrared, microwave, etc. The heat source 20 is schematically shown and is only schematically shown in position. The structure and position can be suitably selected to heat the interior volume 18. In any of the examples, the furnace 16 can include an exhaust port that can be used to purge vaporized contaminants from the interior volume 18.

The interior volume 18 of the furnace 16 provides space for the contaminated boron powder 12. A furnace heating cycle can begin after the boron powder 12 has been placed into the furnace 16. The furnace heating cycle subjects the boron powder 12 to an elevated temperature within the furnace 16. Temperature profiles for the furnace heating cycle may ramp up to a particular temperature, hold constant for a time and then ramp down. However, it is contemplated that the temperature profile may be of various multiple temperatures in order to optimize the heat application to the boron powder 12 and contaminant removal process. In one example, the boron powder 12 is subjected to an elevated temperature of about 500° C. This temperature promotes the vaporization of some organic contaminants, and this temperature can also promote thermal decomposition of some organic contaminants.

The processing system 10 further includes a boat 24, which is one example of an inert container for holding the boron powder 12 within the furnace 16. The boat 24 can be made of material that is resistant to the effects of high temperature, numerous heating and cooling cycles, and is not likely to impart contaminants to the boron powder 12 that it contains. Quartz is a common choice as a boat 24 material, as it can have smooth surfaces which promote easy removal of boron powder 12, it is typically easy to clean, and it has surface characteristics that can make any boron powder 12 remaining in the boat 24 after its intended removal readily visible to the casual observer. Several ceramic compounds are also common choices as a boat 24 material. The boat 24 can be shaped like a rectangular or square bowl, with a horizontal bottom and four vertical sides, although the boat may be constructed of various materials and have varied dimensions and shapes. Boats 24 can be used in batch furnaces or can be used in continuous furnaces, riding a conveyor as they pass through various heating zones.

The processing system 10 can also include at least one port 26 for introducing at least one cover gas 30 (schematically represented by a bottle-type source example) into the furnace 16. The cover gas 30 can provide a special atmosphere within the furnace 16, consisting of one gas or a combination of gases. In one example, hydrogen is used as a cover gas 30. Hydrogen provides a reducing atmosphere within the furnace 16. One quality of the hydrogen reducing atmosphere is the promotion of the break-down of longer carbon chains into smaller, more easily volatilized organic compounds. This quality is particularly useful in eliminating some of the organic contaminants such as lubrication oil from a typical industrial compressed air supply. This lubrication oil is formulated specifically to be resistant to thermal decomposition. The break-down of the carbon chains that make up the lubrication oil can lead to the vaporization of resultant organic contaminants that are more susceptible to thermal decomposition. Additionally, the hydrogen cover gas 30 minimizes the oxidation of the boron powder 12. The combination of the hydrogen reducing atmosphere and a furnace 16 temperature of about 500° C. reduces the likelihood of oxidation of the boron powder 12. Lower oxidation rates tend to eliminate boron coating defects in downstream manufacturing processes. Another benefit to the inclusion of a cover gas is that reactive or inert cover gases provide convection. Convection action within the interior volume 18 helps to speed the transfer of heat into the boron powder 12 and also helps to purge any vaporized compounds from the surface of the boron powder 12.

The processing system 10 can also be used with a cooling cycle after the thermal decomposition of the contaminants. In order to decrease oxidation of the boron powder 12, the boron powder 12 can be cooled prior to removal from the interior volume 18 and the protective special atmosphere within the interior volume 18. One example of a cooling cycle includes reduction of the boron powder 12 temperature to less than about 100° C. prior to removing the boron powder 12 from the interior volume 18.

Removal of the organic contaminants in the boron powder 12 via the break-down of longer carbon chains into smaller, more easily volatilized organic compounds and the vaporization of organic contaminants enables production of a boron powder 12 with not more than about 0.1 weight percent of soluble residue. This level of impurity can be considered to be an acceptable level of soluble residue that does not affect a hydrophilic nature of the boron powder 12. One solvent that can be used to determine the amount of soluble residue within the boron powder 12 is methylene chloride via methods that are known in the art.

The method of removing organic contaminants from boron powder 12 using a furnace 16 to break-down longer carbon chains and vaporize the organic contaminants and the associated process system is one solution to remove organic contaminants from a boron powder 12. Additionally, the use of a furnace 16 to remove the organic contaminates is a relatively simple alternative to other chemical wash methods of removing organic contaminants from boron powder 12. Furthermore, the use of hydrogen as a cover gas 30 in a reducing atmosphere reduces the likelihood of oxidation of the boron powder 12.

Figure 2:
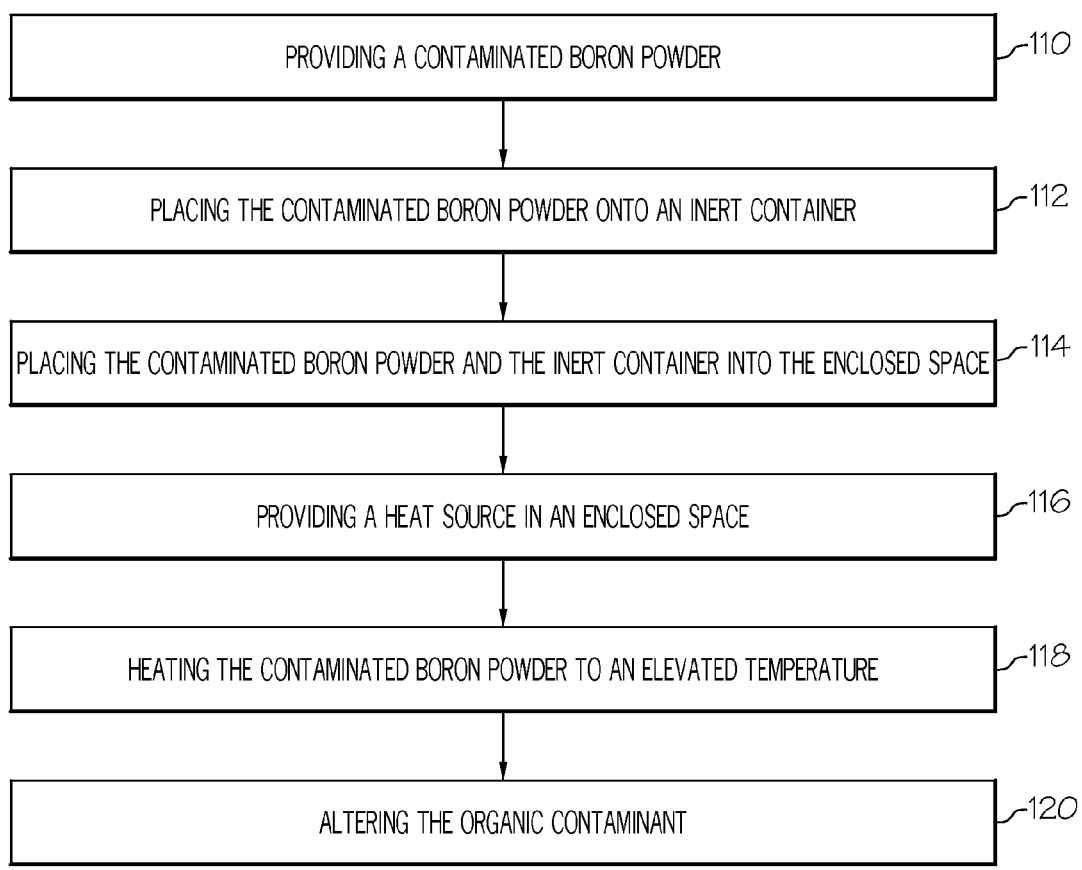
FIG. 2 is a top level flow diagram of an example method of removing organic contaminants from boron powder in accordance with an aspect of the present invention.

An example method of removing organic contaminants from boron powder 12 to meet purity requirements for downstream manufacturing applications is generally described in FIG. 2. The method can be performed in connection with the example furnace 16 shown in FIG. 1. The method includes the step 110 of providing a contaminated boron powder 12, the boron powder being comingled with an organic contaminant. The organic contaminants can be introduced to the boron powder 12 during a jet milling operation from sources such as air compressor oils, adhesive materials, and particles of a polymeric liner material used on the interior of a jet mill.

The method includes the step 112 of placing the contaminated boron powder 12 onto a boat 24, which is one example of an inert container used in processing furnaces 16. The boat 24 can be made of material that is resistant to the effects of high temperature, numerous heating and cooling cycles, and is not likely to impart contaminants to the boron powder 12 that it contains. Quartz and some ceramic compounds are common choices for boat 24 construction material.

The method includes the step 114 of placing the contaminated boron powder 12 and the inert container into the enclosed space. The method includes the step 116 of providing a heat source 20 for an enclosed space. The heat source 20 can be any one or a combination of typical heat sources such as gas, electric heating element, infrared, microwave, etc. Examples of an enclosed space include, but are not limited to batch ovens, continuous ovens, cabinet ovens, tower ovens, sintering furnaces, etc.

The method also includes step 118 of heating the contaminated boron powder 12 to an elevated temperature. The heat source 20 is activated and increases the temperature within the furnace 16. In one example, the heat source 20 subjects the boron powder 12 within the enclosed space to an elevated temperature of about 500° C.

The method includes the step 120 of altering the organic contaminant so as to reduce the amount of organic contaminant comingled with the boron powder 12. In one example, the alteration of the organic contaminant is breaking down long carbon chains forming the organic contaminant. A hydrogen cover gas 30 within the furnace 16 provides a reducing special atmosphere that promotes this break-down of long carbon chains. The alteration of the organic contaminant may also be vaporizing the organic contaminant. Often, these two modes of alteration of the organic contaminant work in cooperation to eliminate organic contaminants. Lubrication oil can be an organic contaminant within the boron powder 12, and it is formulated specifically to be resistant to thermal decomposition. The break-down of the carbon chains that make up the lubrication oil by the reducing atmosphere in the furnace 16 can lead to the vaporization of resultant broken-down organic contaminants that are more susceptible to thermal decomposition.

Figure 3:
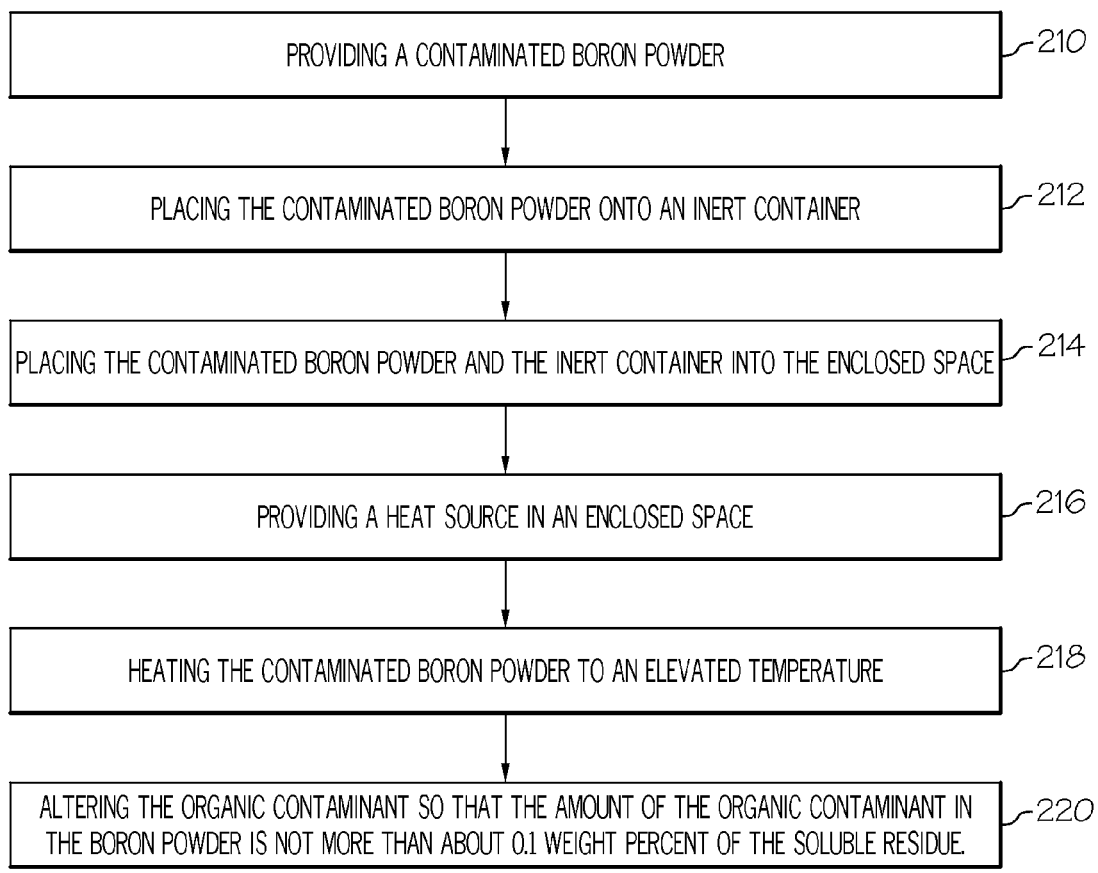
FIG. 3 is a top level flow diagram of an example method of removing organic contaminants from boron powder in accordance with an aspect of the present invention.

Another example method of removing organic contaminants from boron powder 12 to meet purity requirements for downstream manufacturing applications is generally described in FIG. 3. The method can be performed in connection with the example furnace 16 shown in FIG. 1. The method includes the step 210 of providing a contaminated boron powder 12, the boron powder being comingled with an organic contaminant. The organic contaminants can be introduced to the boron powder 12 during a jet milling operation from sources such as air compressor oils, adhesive materials, and particles of a polymeric liner material used on the interior of a jet mill.

The method includes the step 212 of placing the contaminated boron powder 12 onto a boat 24, which is one example of an inert container used in processing furnaces 16. The boat 24 can be made of material that is resistant to the effects of high temperature, numerous heating and cooling cycles, and is not likely to impart contaminants to the boron powder 12 that it contains. Quartz and some ceramic compounds are common choices for boat 24 construction material.

The method includes the step 214 of placing the contaminated boron powder 12 and the inert container into the enclosed space. The method includes the step 116 of providing a heat source 20 for an enclosed space. The heat source 20 can be any one or a combination of typical heat sources such as gas, electric heating element, infrared, microwave, etc. Examples of an enclosed space include, but are not limited to batch ovens, continuous ovens, cabinet ovens, tower ovens, sintering furnaces, etc.

The method also includes step 218 of heating the contaminated boron powder 12 to an elevated temperature. The heat source 20 is activated and increases the temperature within the furnace 16. In one example, the heat source 20 subjects the boron powder 12 within the enclosed space to an elevated temperature of about 500° C.

The method includes the step 220 of altering the organic contaminant so as to reduce the amount of organic contaminant comingled with the boron powder 12 so that the amount of the organic contaminant in the boron powder is not more than about 0.1 weight percent of soluble residue. In one example, the alteration of the organic contaminant is breaking down long carbon chains forming the organic contaminant. A hydrogen cover gas 30 within the furnace 16 provides a reducing special atmosphere that promotes this break-down of long carbon chains. The alteration of the organic contaminant may also be vaporizing the organic contaminant. Often, these two modes of alteration of the organic contaminant work in cooperation to eliminate organic contaminants. Lubrication oil can be an organic contaminant within the boron powder 12, and it is formulated specifically to be resistant to thermal decomposition. The break-down of the carbon chains that make up the lubrication oil by the reducing atmosphere in the furnace 16 can lead to the vaporization of resultant broken-down organic contaminants that are more susceptible to thermal decomposition.

The method can further include the step of cooling the boron powder 12 to less than about 100° C. prior to removal of the boron powder 12 from the enclosed space. In order to decrease the potential oxidation of the boron powder 12, the boron powder 12 is kept within the enclosed space for a cooling cycle within the special atmosphere. In one example, the special atmosphere is hydrogen gas which decreases the potential oxidation of the boron powder 12. The boron powder 12 is then cooled to less than about 100° C. before it is removed from the enclosed space. Various cooling profiles are contemplated for the cooling cycle.

In the described examples, the method and apparatus provide a means for cleaning boron powder 12 prior to making a boron powder coating solution, removing any oil films from the surface of the boron powder particles. The removal of organic contaminants in boron powder 12 via the break-down of longer carbon chains into smaller, more easily volatilized organic compounds and the vaporization of organic contaminants enables production of a boron powder 12 with not more than about 0.1 weight percent of soluble residue. This level of impurity can be considered to be an acceptable level of soluble residue that does not affect a hydrophilic nature of the boron powder 12. Additionally, the resulting boron powder 12 containing fewer or no organic contaminants reduces or eliminates downstream boron powder coating defects and improves the repeatability in the coating process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of removing a contaminant from contaminated boron powder, the method including:
   providing a contaminated boron powder, the boron powder being comingled with an organic contaminant;
   placing the contaminated boron powder and the contaminant comingled therewith onto an inert container;
   placing the inert container, the contaminated boron powder, and the contaminant comingled therewith, into an enclosed space;
   providing a heat source for the enclosed space;
   heating the contaminated boron powder and the contaminant comingled therewith to an elevated temperature, wherein the elevated temperature is about 500° C.; and
   altering the contaminant so as to reduce an amount of the organic contaminant.

2. The method according to claim 1, wherein the step of altering the contaminant is breaking down a carbon chain forming the organic contaminant.

3. The method according to claim 1, wherein the step of altering the contaminant is vaporizing the organic contaminant.

4. The method according to claim 1, wherein the method further includes providing a special selected qas atmosphere within the enclosed space.

5. The method according to claim 1, further including the step of cooling the boron powder to less than about 100° C. prior to removal of the boron powder from the enclosed space.

6. A method of removing a contaminant from contaminated boron powder, the method including:
   providing a contaminated boron powder, the boron powder being comingled with an organic contaminant;
   placing the contaminated boron powder and the contaminant comingled therewith onto an inert container;
   placing the inert container, the contaminated boron powder, and the contaminant comingled therewith, into an enclosed space;
   providing a heat source for the enclosed space;
   heating the contaminated boron powder and the contaminant comingled therewith to an elevated temperature; and
   altering the contaminant so as to reduce an amount of the organic contaminant;
   wherein the method further includes providing a selected qas atmosphere within the enclosed space and the special selected qas atmosphere is hydrogen.

7. A method of removing a contaminant from contaminated boron powder, the method including:
   providing a contaminated boron powder, the boron powder being comingled with an organic contaminant;
   placing the contaminated boron powder and the contaminant comingled therewith onto an inert container;
   placing the inert container, the contaminated boron powder, and the contaminant comingled therewith, into an enclosed space;
   providing a heat source for the enclosed space;
   heating the contaminated boron powder and the contaminant comingled therewith to an elevated temperature, wherein the elevated temperature is about 500° C.; and
   altering the contaminant so that the amount of the organic contaminant in the boron powder after a processing cycle is not more than about 0.1 weight percent of soluble residue.

8. The method according to claim 7, wherein the step of altering the contaminant is breaking down a carbon chain forming the organic contaminant.

9. The method according to claim 7, wherein the step of altering the contaminant is vaporizing the organic contaminant.

10. The method according to claim 7, wherein the method further includes providing a special selected gas atmosphere within the enclosed space.

11. The method according to claim 10, wherein the special selected gas atmosphere is hydrogen.

12. The method according to claim 7, further including the step of cooling the boron powder to less than about 100° C. prior to removal of the boron powder from the enclosed space.

* * * * *

UNITED STATES PATENT AND TRADEMARK OFFICE
CERTIFICATE OF CORRECTION

PATENT NO. : 8,409,537 B2
APPLICATION NO. : 13/220053
DATED : April 2, 2013
INVENTOR(S) : James Michael Lustig Page 1 of 1

It is certified that error appears in the above-identified patent and that said Letters Patent is hereby corrected as shown below:

In the Claims

Claim 4, Column 7, line 5, delete "qas" and insert --gas--;

Claim 6, Column 7, line 27, delete "qas" and insert --gas--;

Claim 6, Column 7, line 28, delete "qas" and insert --gas--.

Signed and Sealed this
Twenty-third Day of July, 2013

Teresa Stanek Rea
*Acting Director of the United States Patent and Trademark Office*